(12) United States Patent
Maro (10) Patent No.: US 12,031,556 B2
(45) Date of Patent: Jul. 9, 2024

(54) DUAL GAS PRESSURE ACCUMULATOR SYSTEM

(71) Applicant: DEERE & COMPANY, Moline, IL (US)

(72) Inventor: Randall A. Maro, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/489,918

(22) Filed: Sep. 30, 2021

(65) Prior Publication Data

US 2023/0096845 A1 Mar. 30, 2023

(51) Int. Cl.
*F15B 1/04* (2006.01)

(52) U.S. Cl.
CPC ...................... *F15B 1/04* (2013.01)

(58) Field of Classification Search
CPC ...... F15B 1/24; F15B 15/228; F15B 2201/31; F15B 2201/32; F16L 55/053
USPC ......................................................... 138/31
See application file for complete search history.

(56) References Cited

U.S. PATENT DOCUMENTS

| | | | | |
|---|---|---|---|---|
| 2,540,676 A * | 2/1951 | Wall | ........................ | B60T 17/06 138/30 |
| 2,638,932 A * | 5/1953 | Alexander | ............ | F16L 55/052 138/30 |
| 2,688,984 A * | 9/1954 | Snyder | ...................... | F15B 1/24 138/31 |
| 2,789,581 A * | 4/1957 | Kerr | .......................... | F15B 1/04 138/31 |
| 2,932,951 A * | 4/1960 | Ottestad | ................. | B30B 15/163 60/407 |
| 3,036,809 A * | 5/1962 | Kerr | .......................... | F15B 1/04 92/60 |
| 4,312,382 A * | 1/1982 | Gebauer | ................. | F16L 55/04 138/30 |
| 4,777,800 A * | 10/1988 | Hay, II | ..................... | B63C 11/52 137/236.1 |
| 5,638,676 A * | 6/1997 | Muller | ....................... | F15B 1/02 60/407 |
| 6,834,680 B2 * | 12/2004 | Baugh | ................... | F15B 21/041 138/30 |
| 7,104,052 B1 * | 9/2006 | Hindman | ............. | A01D 34/246 60/415 |

(Continued)

FOREIGN PATENT DOCUMENTS

CN 112648243 A * 4/2021
DE 4226754 A1 3/1993

(Continued)

OTHER PUBLICATIONS

Extended European Search Report and Written Opinion issued in European Patent Application No. 22194144.6, dated Feb. 7, 2023, in 08 pages.

(Continued)

*Primary Examiner* — David R Deal
(74) *Attorney, Agent, or Firm* — Taft Stettinius & Hollister LLP; Stephen F. Rost (57) ABSTRACT

The present disclosure is an accumulator that has an oil chamber, a first piston separating a first gas chamber from the oil chamber, and a second piston separating a second gas chamber from the oil chamber. The first and second piston are independently movable to alter the volume of the oil chamber.

16 Claims, 7 Drawing Sheets

(56) References Cited

U.S. PATENT DOCUMENTS

| | | |
|---|---|---|
| 7,107,767 B2 | 9/2006 | Frazer |
| 10,145,070 B2* | 12/2018 | Reichert ................. E01D 19/00 |
| 10,480,552 B2 | 11/2019 | Tucker et al. |
| 2005/0022996 A1* | 2/2005 | Baugh ................... E21B 33/064 |
| | | 138/31 |
| 2017/0058918 A1* | 3/2017 | Maro ........................ F15B 1/24 |
| 2018/0162188 A1 | 6/2018 | Chikamatsu et al. |
| 2020/0386244 A1* | 12/2020 | Gabor ....................... F15B 1/22 |
| 2022/0397127 A1* | 12/2022 | Weigand ............... F15B 13/027 |

FOREIGN PATENT DOCUMENTS

| | | | |
|---|---|---|---|
| DE | 102018129688 A1 * | 5/2020 | |
| EP | 3252318 B1 | 12/2017 | |
| JP | 2006220252 A | 8/2006 | |

OTHER PUBLICATIONS

Choosing an accumulator takes more than a coin flip, Hydraulics and Pneumatics, Penton Media, Cleveland, OH, US, vol. 63, No. 8, Aug. 1, 2010, pp. 14-18, XP001556656, ISSN: 0018-814X.

* cited by examiner

--PRIOR ART--

DUAL GAS PRESSURE ACCUMULATOR SYSTEM

FIELD OF THE DISCLOSURE

The present disclosure relates generally an accumulator for a hydraulic system and more specifically to an accumulator having two separate gas chambers.

BACKGROUND

A typical accumulator for a hydraulic system only has one gas chamber which limits the accumulator to one pre-charge pressure and one initial gas volume. This limits the standard accumulator's effectiveness over large pressure ranges. For example, in the typical accumulator the gas volume becomes substantially reduced as the pressure in the hydraulic system increases. Once the gas volume is substantially reduced, the standard accumulator will not be able to absorb much more oil. This leads to larger sized accumulators used to address large pressure range applications or a reduction in performance among other things.

SUMMARY

One embodiment is an accumulator that has an oil chamber, a first piston separating a first gas chamber from the oil chamber, and a second piston separating a second gas chamber from the oil chamber. The first and second piston are independently movable to alter the volume of the oil chamber.

In one example of this embodiment the first gas chamber is configured to provide a first pre-charge pressure and the second gas chamber is configured to provide a second pre-charge pressure, the second pre-charge pressure being different than the first pre-charge pressure. One aspect of this example includes a valve coupled to at least one of the first gas chamber or the second gas chamber, wherein the valve is configured to be coupled to a pressure source to alter the corresponding first or second pre-charge pressure. One aspect of this example has a first valve coupled to the first gas chamber and a second valve coupled to the second gas chamber. In part of this aspect, the first valve and the second valve are each coupleable to a pressure source to independently alter the corresponding first or second pre-charge pressure.

Another example of this embodiment has a fluid passage fluidly coupling the oil chamber to a chamber of a hydraulic cylinder assembly. In another example, the first piston and second piston are configured to move coaxially along an accumulator axis in opposite directions as the volume of the oil chamber changes.

In yet another example of this embodiment, the first gas chamber, second gas chamber, and oil chamber are defined within a housing. In part of this example, the first gas chamber and second gas chamber are defined in an accumulator borehole of the housing having a consistent diameter through first gas chamber and the second gas chamber. Another part of this example has a hydraulic borehole defined in the housing and configured to at least partially receive a hydraulic cylinder assembly. A fluid passage is defined in the housing wherein the fluid passage fluidly couples the oil chamber to the hydraulic borehole.

In yet another part of this example an end cap is selectively coupled to the housing to seal at least one of the first gas chamber or the second gas chamber. In one aspect an end cap is selectively coupled to the housing to seal one end of the hydraulic borehole from the surrounding environment and to fluidly seal at least one of the first gas chamber or the second gas chamber. The end cap has an actuator coupler defined therein. In another aspect of this disclosure, the end cap is selectively coupled to the housing with one or more fastener.

Another embodiment of this disclosure is an accumulator assembly that has an oil chamber configured to have a variable oil chamber volume, a first gas chamber configured to have a variable first volume and to contain a first pre-charge pressure, and a second gas chamber configured to have a variable second volume and a second pre-charge pressure. The first pre-charge pressure and the second pre-charge pressure are independently adjustable.

In one example of this embodiment, as the oil chamber volume increases, the first volume is substantially reduced before the second volume is substantially reduced. In another example, the first gas chamber comprises a piston separating the oil chamber and the first gas chamber and the second gas chamber comprises a diaphragm separating the oil chamber from the second gas chamber. Yet another example of this embodiment has a hydraulic cylinder assembly having a rod, wherein at least one of the first gas chamber and the second gas chamber are defined within, or radially about the rod.

Yet another embodiment of this disclosure is a method of manufacturing an accumulator assembly. The method includes creating an accumulator borehole through a housing, creating a hydraulic borehole through the housing, creating a fluid passage through the housing fluidly coupling at least a portion of the hydraulic borehole with the accumulator bore, positioning a first piston and a second piston in the accumulator borehole to define an oil chamber between the first and second piston, the oil chamber fluidly coupled to the fluid passage, positioning a rod having a rod piston in the hydraulic borehole, and coupling an end cap to the housing to retain the corresponding first and second piston in the accumulator borehole and the rod piston in the hydraulic borehole. In this embodiment, fluid applied to the rod piston at a pressure is directed to the oil chamber through the fluid passage and the first and second piston are movable within the accumulator borehole away from one another to increase a volume of the oil chamber.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2b is a section view of the accumulator assembly of FIG. 2a;

FIG. 6 is a process flow chart for manufacturing the accumulator assembly of FIG. 2a.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
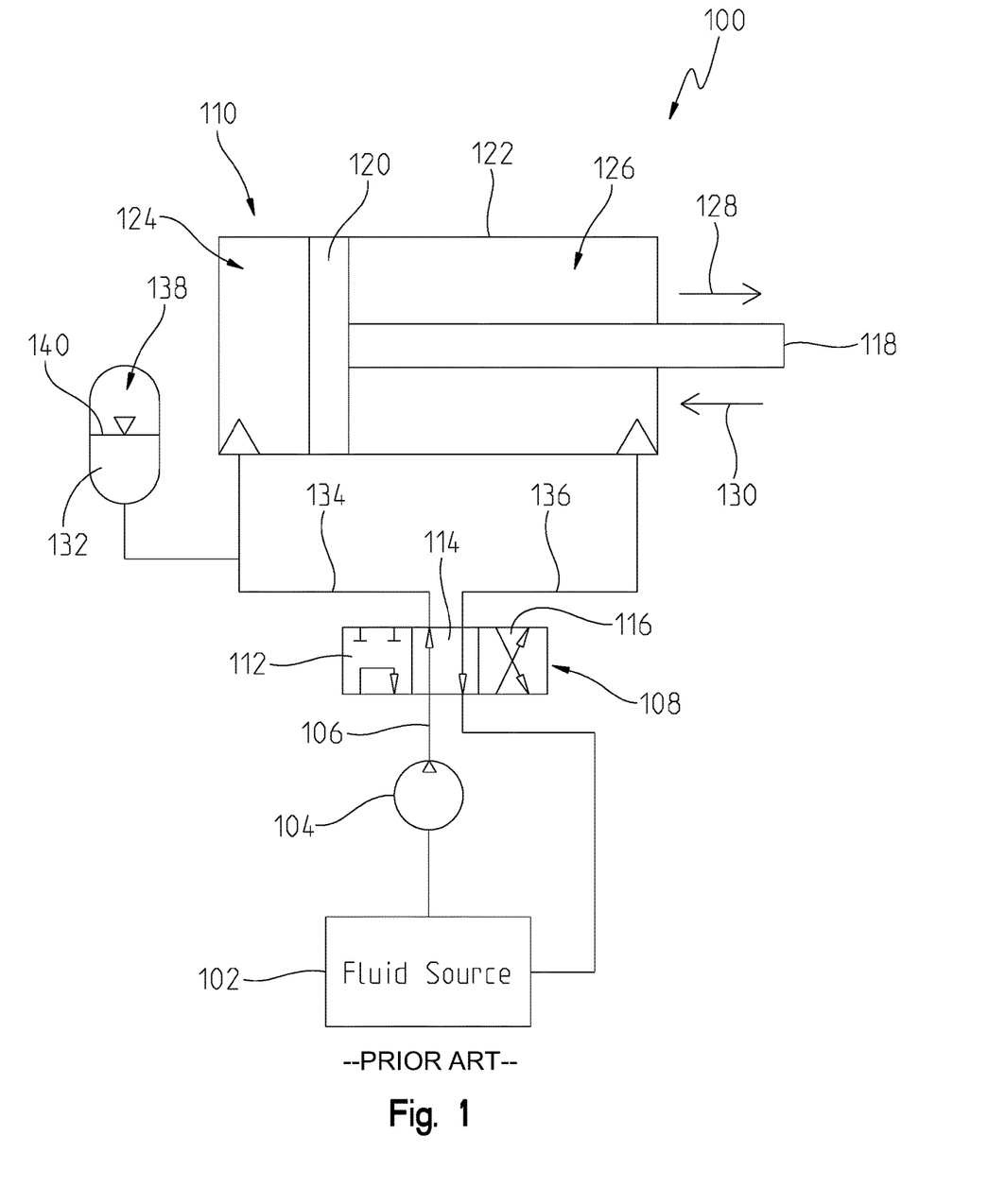
FIG. 1 is a schematic view of a typical hydraulic configuration.

In FIG. 1, a schematic view of a typical hydraulic configuration 100 is illustrated. This configuration has a fluid source 102 that provides fluid, such as hydraulic oil, to a pump 104 that pumps the fluid to provide a pressure and flow of the fluid to conduit 106. The conduit 106 may redirect the pressurized fluid to many different hydraulic components such as valve assemblies, actuators, motors, and the like to provide hydraulic power (i.e., fluid at a pressure and flow) thereto. In the exemplary hydraulic configuration 100 of FIG. 1, the conduit 106 may fluidly couple a valve assembly 108 to the pump 104. This exemplary valve assembly 108 may be a four port, three-position valve that selectively provides pressurized fluid to a hydraulic cylinder assembly 110 to selectively extend, retract, or maintain the linear displacement of the hydraulic cylinder assembly 110. However, this is only one example of a valve assembly and many other type of valve assemblies are considered herein.

The hydraulic cylinder assembly 110 may have a rod 118 coupled to a piston 120 within a cylinder 122 that separates an extension chamber 124 and a retraction chamber 126. The chambers 124, 126 may be defined within the cylinder 122 such that a pressure offset between the chambers 124, 126 may cause the piston 120 and corresponding rod 118 to move linearly towards the low pressure chamber (assuming minimal external forces are acting on the rod 118). In the exemplary embodiment of FIG. 1, as pressurized fluid is provided to the extension chamber 124 and the retraction chamber 126 is exhausted, the piston 120 and rod 118 may move in an extended direction 128. Alternatively, as pressurized fluid is provided to the retraction chamber 124 and the extension chamber 126 is exhausted, the piston 120 and rod 118 may move in a retracted direction 130. Further, if fluid is restricted from entering or leaving the chambers 124, 126, the rod 118 and piston 120 may remain in substantially the same location within the cylinder 122.

The valve assembly 108 may be configured to be selectively moved between a first position 112, a second position 114, and a third position 116. The first position 112 routes the conduit 106 from the pump 104 back to the fluid source 102 or to other components of the hydraulic system and isolates fluid in in the chambers 124, 126 to thereby substantially lock the rod 118 and piston 120. In the second position 114, pressurized fluid may be directed to the extension chamber 124 while the retraction chamber 126 is vented or otherwise directed to a low pressure reservoir to extend the rod 118 and piston 120 in the extended direction 128. In the third position 116, pressurized fluid may be directed to the retraction chamber 126 while the extension chamber 124 is vented or otherwise directed to a low pressure reservoir to move the rod 118 and piston 120 in the retracted direction 128. The valve assembly 108 may be selectively controlled electronically as part of an electro-hydraulic system or may be manually manipulated among other methods.

In the hydraulic configuration 100 of FIG. 1, an accumulator 132 may be fluidly coupled to conduit 134 fluidly coupling the valve assembly 108 to the hydraulic actuator 110. In the exemplary embodiment of FIG. 1, the accumulator 132 may be coupled to the conduit 134 fluidly coupled to the extension chamber 124, however, other examples may position the accumulator 132 on conduit 136 fluidly coupled to the retraction chamber 126. Regardless, the accumulator 132 may provide a gas chamber 138 that is separated from the fluid in the conduit 134 by a diaphragm or piston 140. In this configuration, if the fluid pressure in the conduit 134 experiences extreme pressures, pressure spikes, or other pressure variations, the diaphragm or piston 140 may be repositioned to accommodate additional, or less, fluid in the accumulator 132 by altering the volume of the gas chamber 138. In the example of FIG. 1, the accumulator has a single gas chamber 138 and once the diaphragm or piston 140 substantially expands, the accumulator 132 may not be able to absorb much more fluid from the conduit 134 or extension chamber 124. Further, the accumulator 132 has a single gas chamber 138 and therefore is only capable of providing a single pre-charge pressure. As such, the accumulator 132 may not be able to accommodate wide-range pressure variations.

Figure 2A:
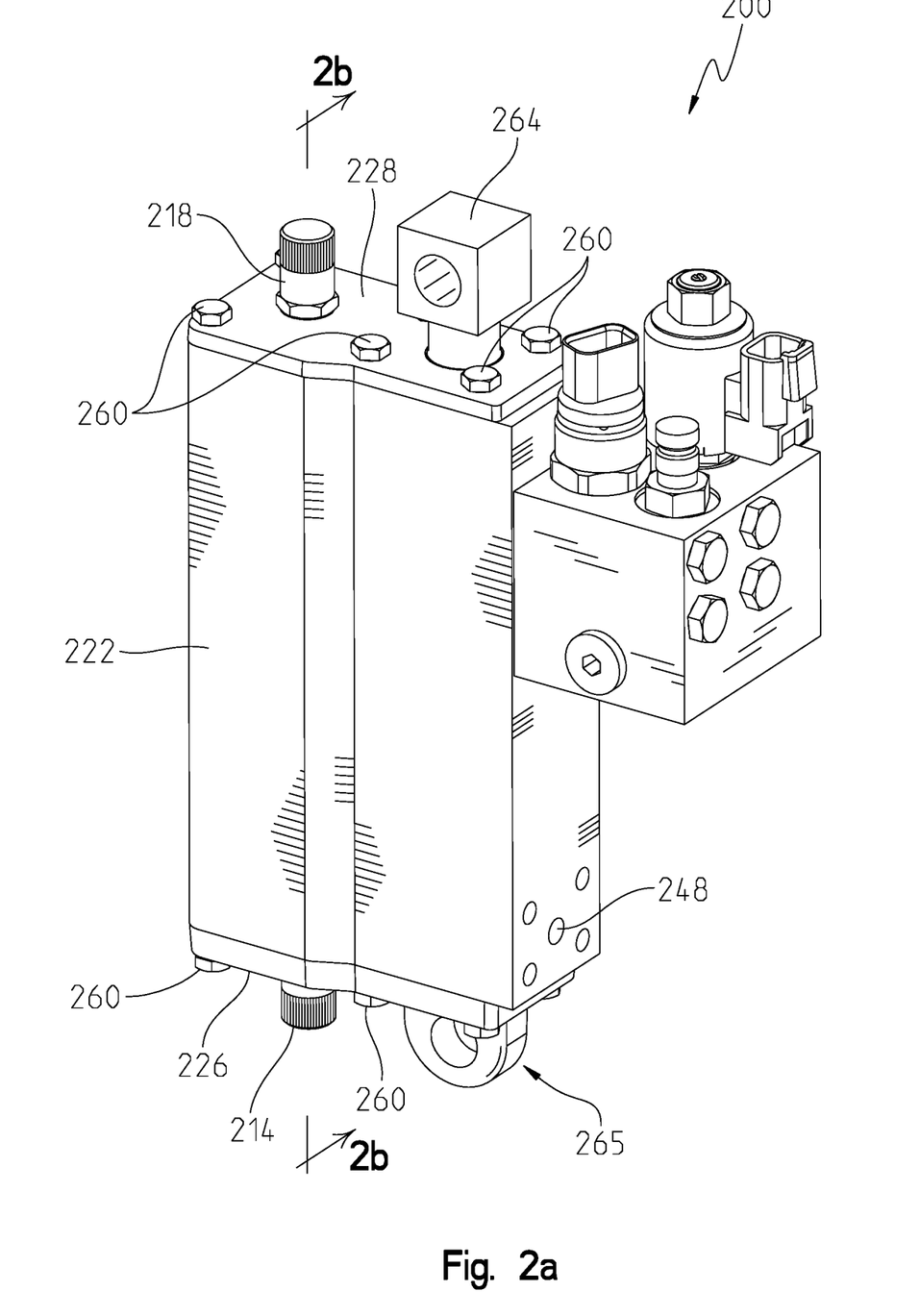
FIG. 2a is an elevated perspective view of a dual gas chamber accumulator assembly.
Figure 2B:
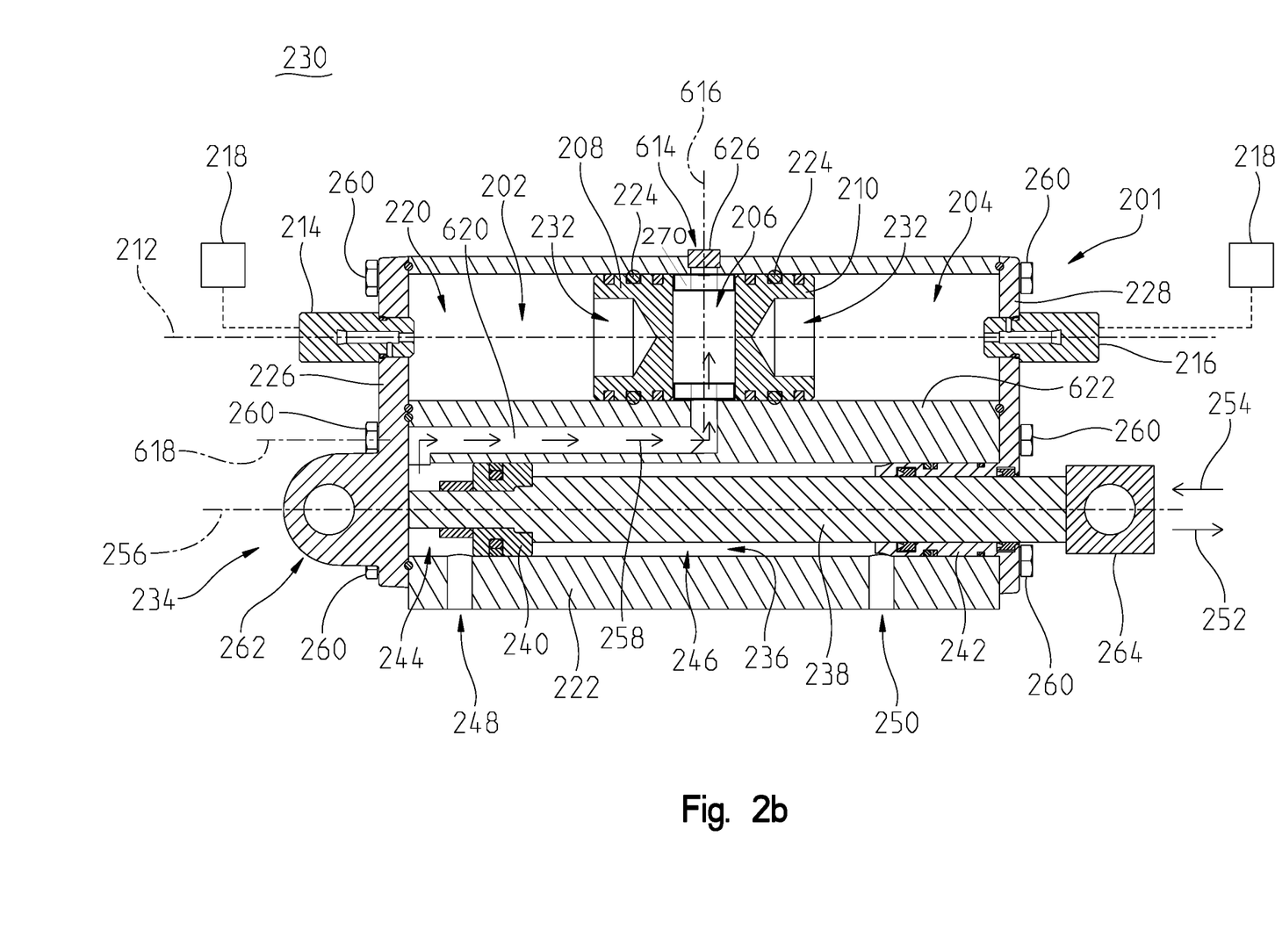

Referring now to FIGS. 2a and 2b, a section view of one embodiment of an accumulator assembly 200 of the present disclosure is illustrated in an elevated perspective view in FIG. 2a and in a section view in FIG. 2b. The accumulator assembly 200 may have an accumulator 201 that provides gas chambers that are compressible to address pressure variations in a hydraulic system. More specifically, the accumulator 201 of the accumulator assembly 200 may provide a first gas chamber 202 and a second gas chamber 204 that may provide different pre-charge pressures therein. Pre-charge pressure refers to the pressure of the gas within the corresponding chambers 202, 204 when the corresponding hydraulic assembly is not providing a substantial pressure. In other words, pre-charge pressure may refer to the pressure in the corresponding chambers 202, 204 when the system is in a neutral state (i.e., not providing substantial pressure to an oil chamber 206 of the accumulator 201).

In the accumulator assembly 200 of FIG. 2, the first gas chamber 202 may be separated from the oil chamber 206 by a first piston 208 and the second gas chamber 204 may be separated from the oil chamber 206 by a second piston 210. In this configuration, when pressurized fluid is provided to the oil chamber 206, the pistons 208, 210 may slide axially away from one another along an accumulator axis 212 to further compress any gases in the corresponding chambers 202, 204. In other words, as the volume of the oil chamber 206 increases, one or both of the pistons 208, 210 extend away from the other along the accumulator axis 212 to accommodate more fluid in the oil chamber 208.

In one aspect of the accumulator assembly 200, a first valve 214 may be fluidly coupled to the first gas chamber 202 and a second valve 216 may be fluidly coupled to the second gas chamber 204. The first and second valves 214, 216 may provide a location for one or more pressure source 218 to selectively alter the pre-charge pressure of the corresponding chamber 202, 204. In this configuration, the pressure source 218 may be part of a pneumatic system of a work machine. Alternatively, it may be a manual pump that can be coupled to the corresponding valve 214, 216 to alter the pressure of the corresponding chamber 202, 204. Further still, an electro-pneumatic system may be coupled to the first and second gas chambers 202, 204 through the corresponding valves 214, 216 to selectively alter the pre-charge pressure therein.

The first and second piston 208, 210 may slide axially along the accumulator axis 212 within an accumulator borehole 220 defined within a housing 222. The accumulator borehole 220 may be a substantially cylindrical bore through the housing 222. Further, the cylindrical walls of the accumulator borehole 220 may define a portion of the first gas chamber 202, the second gas chamber 204, and the oil chamber 206. The pistons 208, 210 may be correspondingly sized to fit within the accumulator borehole 220 and fluidly seal the oil chamber 206 from the corresponding first and second gas chambers 202, 204. In one aspect of this disclosures, the pistons 208, 210 may have one or more seal 224 positioned between the outer walls of the corresponding piston 208, 210 and the radial wall of the accumulator borehole 220 to fluidly seal the oil chamber 206 from the corresponding first and second gas chambers 202, 204. The accumulator borehole 220 may have a substantially consistent radius through the first gas chamber 202, oil chamber 206, and second gas chamber 204 to allow all of the chambers 202, 204, 206 to be partially formed in the same manufacturing step (i.e., drilling or otherwise forming the accumulator borehole 220 in the housing 222).

In one aspect of this disclosure, a stop 270 may be formed in the housing 222 to ensure the first and second piston 208, 210 do not extend past the stop 270 to obstruct a fluid passage 258 to the oil chamber 206. The stop 270 may be formed by a radially inward section of the housing 222 defined about the location wherein the fluid passage 258 extends into the oil chamber 206. Alternatively, the stop 270 may be a C-clip for each piston 208, 210 that extends into corresponding grooves defined in the interior walls of the oil chamber 206 to substantially prevent the corresponding piston 208, 210 from extending into the oil chamber 206 to obstruct the fluid passage 258.

The housing 222 may have an end cap 226, 228 coupled to opposing sides of the housing 222 to substantially fluidly isolate the corresponding gas chambers 202, 204 from a surrounding environment 230. In this example, the first gas chamber 202 may be defined by the cylindrical wall of the accumulator borehole 220 through the housing 222, the first piston 208, and the end cap 226. Similarly, the second gas chamber 204 may be defined by the cylindrical wall of the accumulator borehole 220 through the housing 222, the second piston 210, and the end cap 228.

Each piston 208, 210 may have piston cavity 232 defined therein. The piston cavity 232 may be a cavity defined in the corresponding piston 208, 210 sized to allow any protruding elements of the corresponding valves 214, 216 to be partially positioned therein when the corresponding piston 208, 210 is in, or about in, a fully extended position. The fully extended position may be the position wherein the corresponding piston 208, 210 is as close as possible to the corresponding end cap 226, 228 thereby maximizing the volume of the oil chamber 206. The piston cavity 232 may ensure that the corresponding piston 208, 210 can become positioned in the fully extended position without substantially contacting or damaging any portion of the corresponding valve 214, 216.

The accumulator assembly 200 may also have a hydraulic cylinder assembly 234 similar to the hydraulic cylinder assembly 110. However, in the embodiment of FIG. 2, the hydraulic cylinder assembly 234 is at least partially defined within a hydraulic borehole 236 in the same housing 222 as the accumulator 201. In this configuration, the hydraulic borehole 236 is defined through a portion of the housing 222 to accommodate a rod 238, rod piston 240, and seal 242 of the hydraulic cylinder assembly 234. The rod 238 and piston 240 may function in substantially the same way as discussed herein for the hydraulic cylinder assembly 110. That is, the rod piston 240 may fluidly separate an extension chamber 244 on one end of the hydraulic borehole 236 from a retraction chamber 246 on the other end. Further, hydraulic fluid may be selectively provided to, or removed from, the extension chamber 244 through an extension orifice 248. Similarly, hydraulic fluid may be selectively provided to, or removed from, the retraction chamber 246 through a retraction orifice 250.

The extension orifice 248 and retraction orifice 250 may be fluidly coupled to a hydraulic system such as the valve assembly 108, pump 104, and fluid source 102 discussed herein to selectively move the rod 238 and rod piston 240 in an extension direction 252 or a retraction direction 254 along a rod axis 256. In one embodiment considered herein, hydraulic cylinder assembly 234 may be coupled to movable components of a work machine or the like. The work machine may have an electro-hydraulic system that selectively controls the valve assembly 108 to alter the position of the rod 238 and rod piston 240 in the extension direction 252 or the retraction direction 254.

The housing 222 may also define the fluid passage 258 therein that fluidly couples the extension chamber 244 to the oil chamber 206. In this configuration, when pressure spikes or the like are introduced to the fluid in the extension chamber 244, the volume of the oil chamber 206 may increase as the pistons 208, 210 move axially away from one another and the gas in the corresponding chambers 202, 204 is further compressed. In other words, in the embodiment of FIG. 2 the housing 222 may provide a structural base for the accumulator 201 and the hydraulic cylinder assembly 234 while simultaneously providing a fluid passage 258 that fluidly couples the oil chamber 206 to the extension chamber 244.

The end caps 226, 228 may also partially enclose the extension chamber 244 and retraction chamber 246 with the hydraulic borehole 236 of the housing 222. More specifically, the end caps 226, 228 may be positioned on axial ends of the hydraulic borehole 236 to substantially seal the interior of the borehole 236 from the surrounding environment 230. In one aspect of this disclosures, seals or the like may be positioned between the corresponding end caps 226, 228 and the housing 222 at each end of the accumulator and hydraulic borehole 220, 236 to assist with sealing the corresponding bores 220, 236. Further, the end caps 226, 228 may be removably coupled to the housing 222 with fasteners 260. More specifically, the housing 222 may have threaded holes to receive fasteners 260 such as screws to removably couple the end caps 226, 228 to the housing 222.

In another aspect of this disclosure, an actuator coupler 262 may be formed in the end cap 226. The actuator coupler 262 may be a coupling location along the rod axis 256 that provides sufficient structural strength to couple the hydraulic cylinder assembly 234 to movable components of a work machine or the like. In one example, a rod coupler 264 may be coupled to a first movable component of a work machine and the actuator coupler 262 may be coupled to a second component of the work machine. In this configuration, the rod 238 may move in either the extension direction 252 or the retraction direction 254 to alter the orientation of the first movable component relative to the second component. Further still, the accumulator 201 may absorb pressure spikes caused by either the hydraulic system of the work machine or physical inputs on the rod 238 in the retraction direction 254.

While the hydraulic cylinder assembly 234 is described herein as formed within the same housing 222 as the accumulator 201, other embodiments considered herein separate the hydraulic assembly from the housing of the accumulator. More specifically, the accumulator 201 may substantially replace the accumulator 132 illustrated in FIG. 1. In this configuration, the fluid passage 258 of the accumulator 201 may utilize conduit, hose, or the like to be routed to the extension chamber 124 of the hydraulic cylinder assembly 110.

Figure 3:
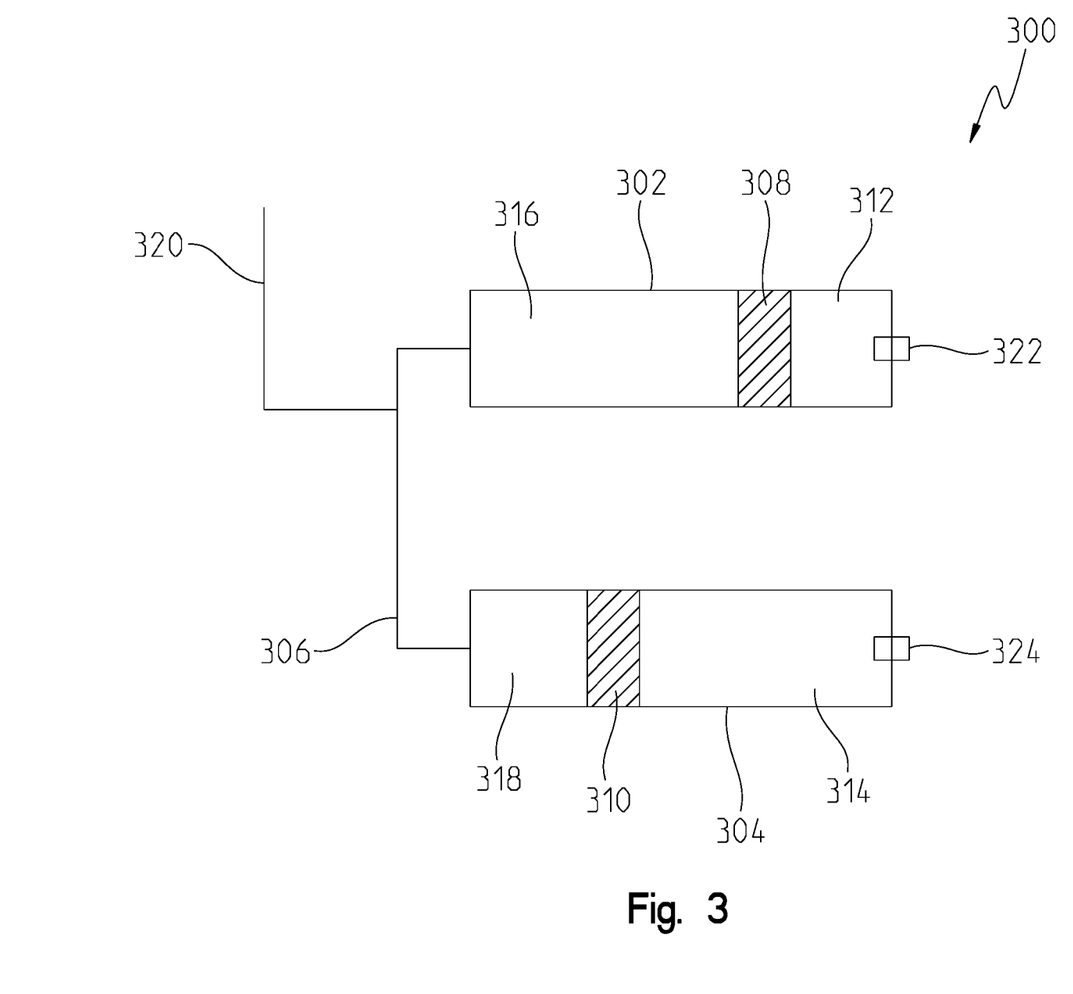
FIG. 3 is another embodiment of a dual gas chamber accumulator assembly.

Further still, in another embodiment contemplated herein and illustrated in FIG. 3, an accumulator assembly 300 may provide two separate accumulators 302, 304 fluidly coupled to one another through conduit 306. The accumulators 302 may function in substantially similar ways as the accumulator 201 wherein pistons 308, 310 separate corresponding gas chambers 312, 314 from oil chambers 316, 318. However, in the embodiment of FIG. 3 the conduit 306 fluidly couples the separate oil chambers 316, 318 to one another and provides a coupling location 320 for the extension chamber 124 of the cylinder assembly 110. The gas chambers 312, 314 may also have valves 322, 324 that allow the gas chambers 312, 314 to be independently pressurized with different pressures similar to valves 214, 216 discussed herein.

Figure 4:
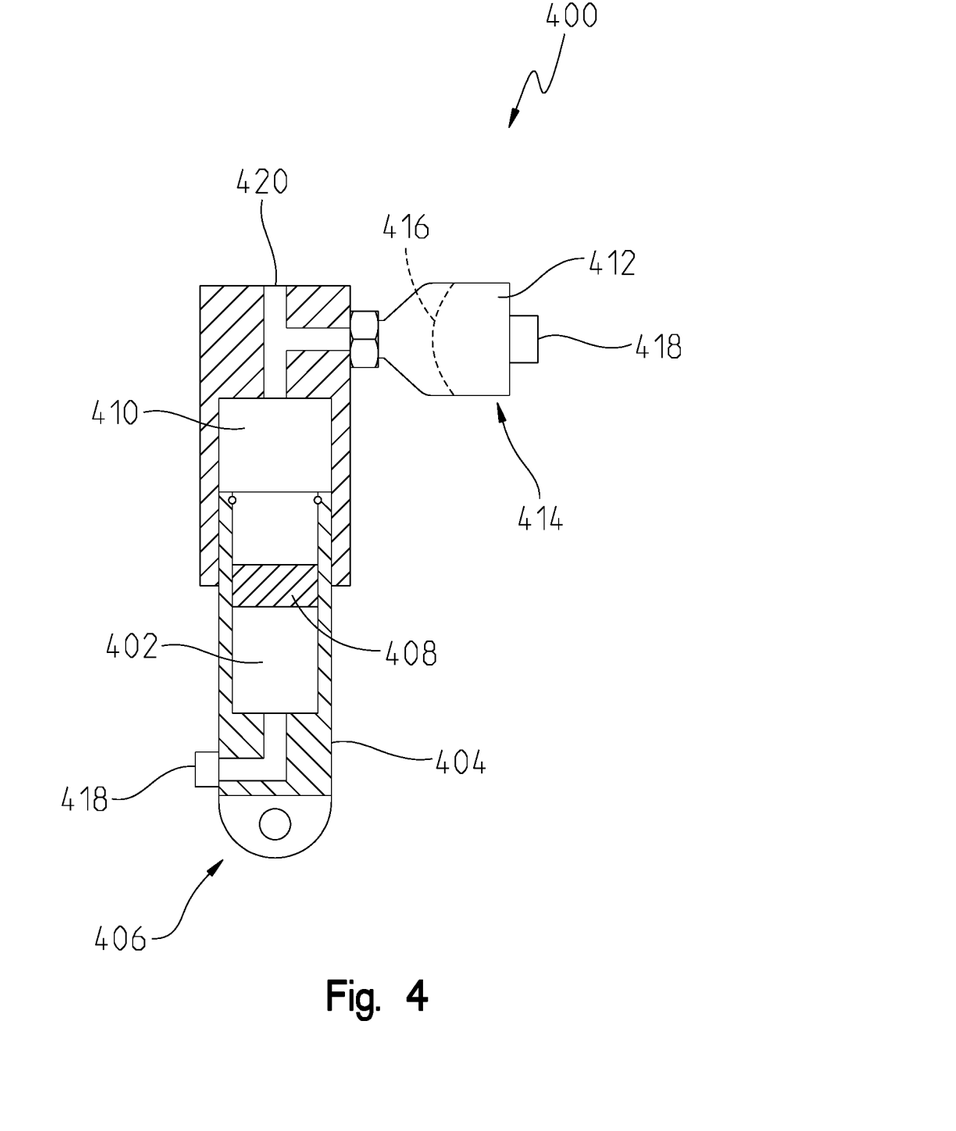
FIG. 4 is another embodiment of a dual gas chamber accumulator assembly.

Referring now to FIG. 4, another embodiment of a dual-gas chamber accumulator assembly 400 is illustrated. In the embodiment of FIG. 4, the accumulator assembly 400 may define a first gas chamber 402 at least partially within a rod 404 of a hydraulic cylinder assembly 406. More specifically, the rod 404 may have a cylindrical cavity therein with a piston 408 positioned within the cylindrical cavity. The piston 408 may separate the first gas chamber 402 from an oil chamber 410. Further, conduit may fluidly couple the oil chamber 410 to a diaphragm accumulator 414 having a second gas chamber 412 fluidly separated from the oil chamber 410 by a diaphragm 416. Both the first gas chamber 402 and the second gas chamber 412 may have valves 418 coupled thereto allow the pre-charge pressure in the corresponding gas chambers 402, 412 to be selectively altered as discussed herein with reference to valves 214, 216.

In the accumulator assembly 400, fluid pressure may be provided to the oil chamber 410 at a fluid input 420 by a hydraulic system or the like. The rod 404 may extend or retract responsive to changes in the pressure of fluid provided at the fluid input 420 and the gas in the gas chambers 402, 412 may be compressed to modify the volume of the oil chamber 410 to address spikes or drops in the fluid pressure of the oil chamber 410 as discussed herein.

Figure 5:
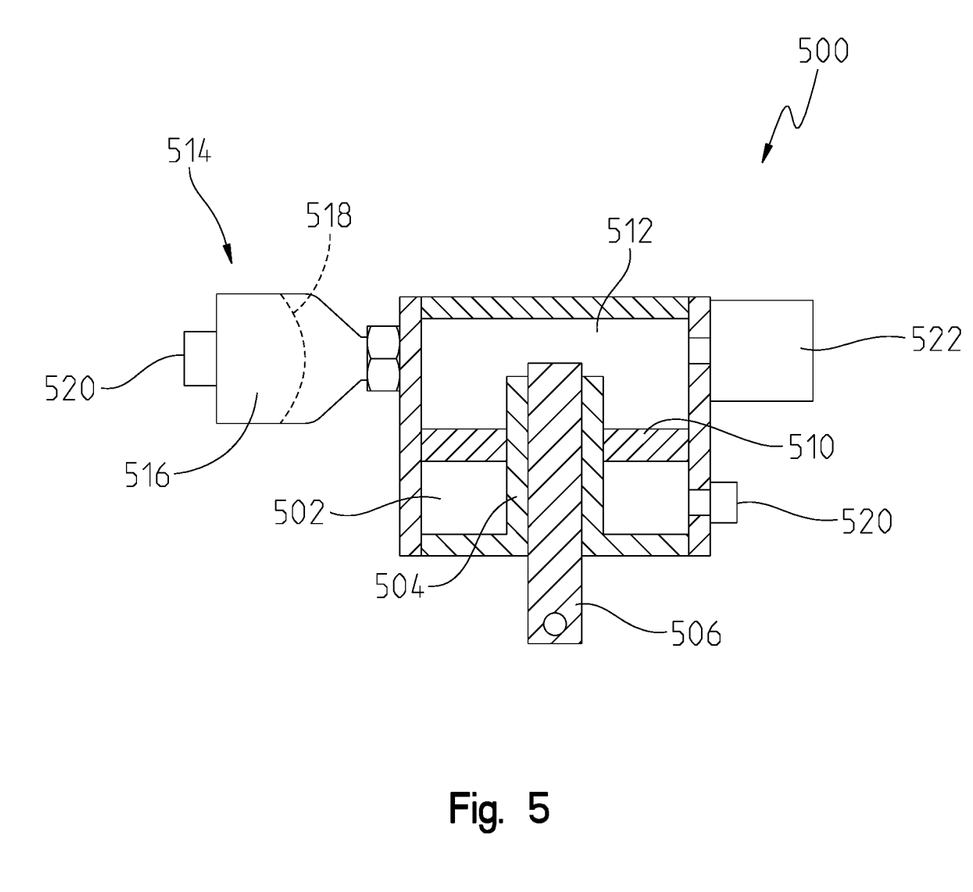
FIG. 5 is another embodiment of a dual gas chamber accumulator assembly.

Referring now to FIG. 5, yet another embodiment of a dual gas chamber accumulator assembly 500 is illustrated. The accumulator assembly 500 of FIG. 5 may have a first gas chamber 502 defined in an annular cavity around a cylinder 504 and rod 506 of a hydraulic cylinder assembly 508. This configuration may have an annular disk-shaped piston 510 that slides along a radially outer wall of the cylinder 504 to separate the first gas chamber 502 from an oil chamber 512. A diaphragm accumulator 514 having a second gas chamber 516 may be fluidly separated from the oil chamber 512 by a diaphragm 518. Both the first gas chamber 502 and the second gas chamber 516 may have valves 520 coupled thereto allow the pre-charge pressure in the corresponding gas chambers 502, 516 to be selectively altered as discussed herein with reference to valves 214, 216.

In the accumulator assembly 500, a valve assembly 522 may be similar to valve assembly 108 and may selectively alter the pressure of fluid provided to the oil chamber 512 from a hydraulic system. In this configuration, the accumulator assembly 500 may address spikes or reductions in fluid pressure in the oil chamber 512 by modifying the volume of the oil chamber 512 through movement of the corresponding piston 510 and diaphragm 518.

All embodiments of the dual gas chamber accumulator assembly discussed herein (i.e., FIGS. 2-5) may provide separate gas chambers that can be independently filled to different pre-charge pressures. This may provide for a more compact accumulator assembly that can address a wider range of oil chamber pressure and volume change compared to single gas chamber accumulators. More specifically, the first gas chamber may have a low pre-charge pressure while the second gas chamber may have a relatively high pre-charge pressure. In this configuration, as the oil chamber experiences a moderate spike in pressure, the relatively low pre-charge pressure in the first chamber may be further compressed until the first gas chamber cannot be compressed much more while the volume of the second gas chamber remains unsubstantially changed. At this time, if the oil pressure in the oil chamber continues to increase, the second gas chamber may begin to compress the relatively high pre-charged gas chamber to further expand the volume of the oil chamber to accommodate the pressure spike in the oil chamber.

Figure 6:
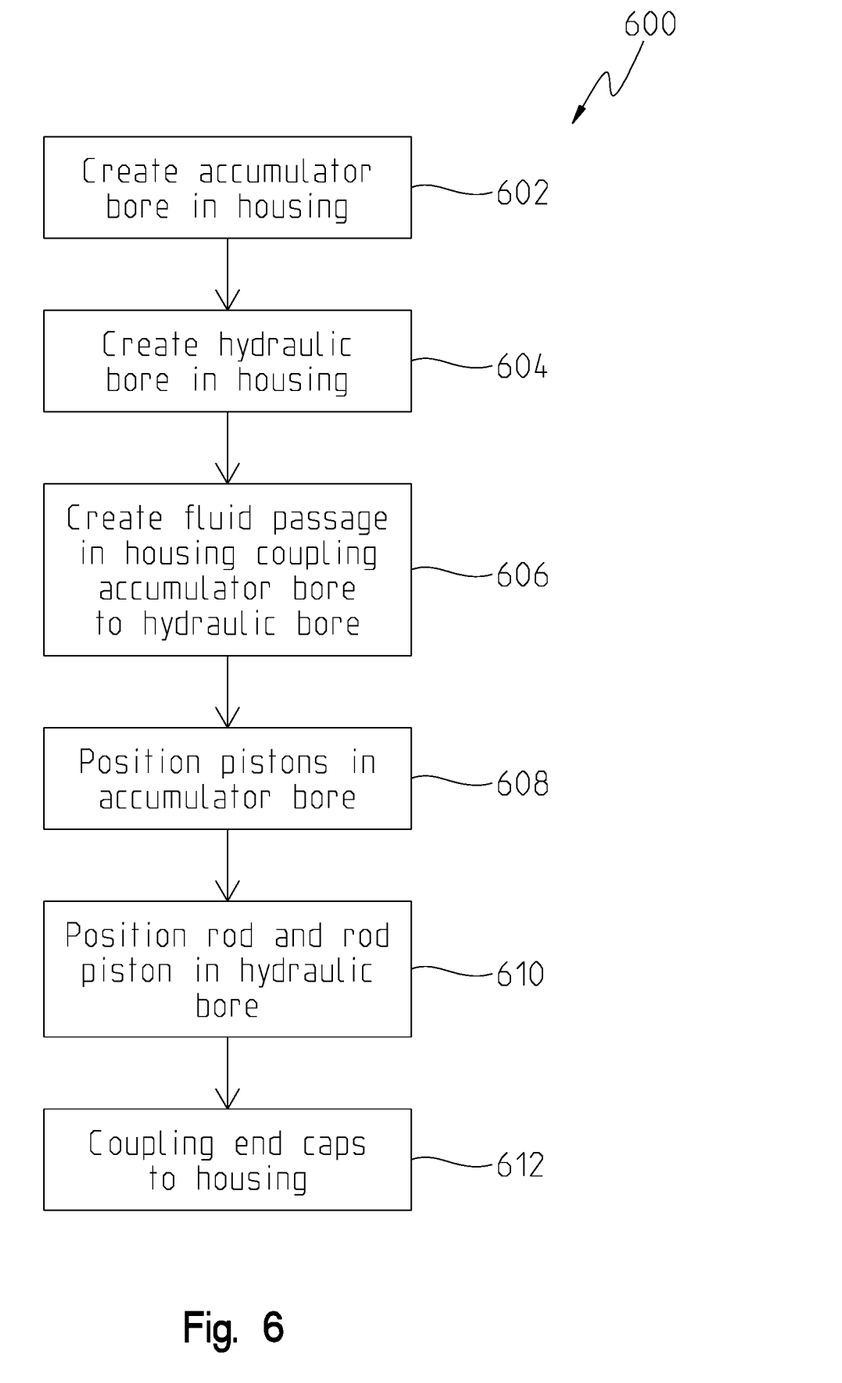

Referring now to FIG. 6, one exemplary manufacturing flow-chart 600 for the accumulator assembly 200 is illustrated. In this flow-chart 600, a single piece of material may be provided for the housing 222. Then, in box 602, the accumulator borehole 220 may be created in the housing 222. The accumulator borehole 220 may be drilled or otherwise bored through the housing 222 along the accumulator axis 212. In the embodiment with a stop 270 formed in the housing 222, the borehole 220 may extend only to the stop 270 and be formed from either side of the housing 222. A smaller borehole may be defined through the stop 270 to form the oil chamber 206 therein. The stop 270 may extend substantially radially inward to contact and prevent the pistons 208, 210 from entering the oil chamber 206 and obstructing the fluid passage 258.

In an alternative embodiment, the borehole 220 may be formed by a single drilling process wherein the entire borehole 220 is about the same radius. In this configuration, the stop 270 may be formed by a C-clip positioned in recesses formed on either side of the oil chamber 206. The C-clips may be sized to contact the corresponding pistons 208, 210 to prevent the pistons 208, 210 from entering the oil chamber 206 and obstructing the fluid passage 258 similarly to the stop 270.

Similarly, in box 604 the hydraulic borehole 236 may be formed through the housing 222 via drilling or otherwise boring the hydraulic borehole 236 through the housing 222 along the rod axis 256. In one exemplary embodiment, the hydraulic borehole 236 and the accumulator borehole 220 may be substantially parallel to one another through the housing 222.

The fluid passage 258 may be formed in the housing in step 606 to provide a fluid pathway from the accumulator borehole 220 to the hydraulic borehole 236. The fluid passage 258 may be formed by a first partial through-hole 614 defined along a first passage axis 616. The first passage axis 616 may be substantially perpendicular to the accumulator axis 212 and the first partial through-hole 614 may be formed by a drilling process that extends through a wall of the accumulator borehole 220, through the accumulator borehole 220, and at least partially into a wall 622 of the housing 222 separating the accumulator borehole 220 and the hydraulic borehole 236. After the first partial through-hole 614 is formed, a plug 626 may be placed in the wall of the accumulator borehole 220 to substantially isolate the accumulator borehole 220 from the surrounding environment 230.

A second partial through-hole 620 may also be formed through the wall 622 of the housing 222 along a second passage axis 618. The second passage axis 618 may be parallel with the accumulator axis 212 and perpendicular to the first passage axis 616. The second partial through-hole 620 may extend from one side of the housing 222 into the wall 622 until the second partial through-hole 620 at least partially intersects the first partial through-hole 614. A radial passage 624 may be formed at the entry point of the second partial through-hole 620 fluidly coupling the second partial through-hole 620 to the hydraulic borehole 236. In this configuration, once the end cap 226 is coupled to the housing 222, the fluid passage 258 may fluidly couple the extension chamber 244 to the oil chamber 206 as illustrated in FIG. 2b.

In box 608, the pistons 208, 210 may be positioned in the accumulator borehole 220 on opposing sides of the first partial through-hole 614 to partially define the oil chamber 206. Seals 224 may be positioned on the pistons 208, 210 prior to insertion into the accumulator borehole 220 and the pistons 208, 210 may be oriented so the piston cavities 232 are facing the corresponding valves 214, 216. In the C-clip stop configuration, the C-clips may be positioned within the borehole 220 prior to inserting the pistons 208, 210 to prevent the pistons 208, 210 from moving too far into the oil chamber 206 and blocking the fluid passage 258. In the stop 270 configuration, the pistons 208, 210 will be prevented from blocking the fluid passage 258 through contract with the stop 270 formed from the housing 222. The rod 238 and rod piston 240 may be positioned within the hydraulic borehole 236 in box 610.

In box 612, the end caps 226, 228 may be coupled to the housing 222 to substantially lock the pistons 208, 210 and rod piston 240 within the corresponding boreholes 220, 236. Further, the end caps 226, 228 may have seals, gaskets, or the like to substantially prevent gas or fluid from escaping between the housing 222 and the corresponding end cap 226, 228. In one aspect of this disclosure, the end cap 228 may have the seal 242 for the hydraulic cylinder assembly 234 formed therein. Further, the fasteners 260 may be tightened to the housing 222 at the appropriate torque to ensure the end caps 226, 228 maintain the fluid-tight coupling to the housing 222. The valves 214, 216 may be coupled to the corresponding end caps 226, 228 either before the end caps 226, 228 are coupled to the housing 222 or afterwards in a separate step.

Once the accumulator assembly 200 is manufactured and assembled as discussed herein, the actuator coupler 262 and rod coupler 264 may be coupled to movable components of a work machine or the like. Further, a hydraulic system may be fluidly coupled to the orifices 248, 250 through a valve assembly to selectively actuate the hydraulic cylinder assembly 234.

The accumulator assembly 200 is illustrated having an extension orifice 248 and retraction orifice 250 fluidly coupled to a hydraulic system to selectively move the rod 238 and rod piston 240 in an extension direction 252 or a retraction direction 254 along a rod axis 256. Further, the fluid passage 258 is illustrated as fluidly coupling the extension chamber 244 to the oil chamber 206. However, this disclosure also contemplates routing the fluid passage 258 to the retraction chamber 246. In this configuration, when pressure spikes or the like are introduced to the fluid in the retraction chamber 246, the volume of the oil chamber 206 may increase as the pistons 208, 210 move axially away from one another and the gas in the corresponding chambers 202, 204 is further compressed. In other words, the fluid passage 258 can be routed to either the extension chamber 244 or the retraction chamber 246 to provide the benefits of the accumulator assembly 200 either while the extension chamber 244 is being pressurized or while the retraction chamber 246 is being pressurized.

While the hydraulic assembly illustrated in FIG. 2b may be a double acting cylinder, in other embodiments considered herein the accumulator assembly 200 may be applied to a single acting cylinder assembly. For example, a single acting extension hydraulic cylinder may route the fluid passage 258 to the extension chamber 244. Alternatively, a single acting retraction cylinders may route the fluid passage 258 to the retraction chamber 246. Accordingly, the accumulator assembly 200 contemplated herein can be applied to any hydraulic cylinder configuration.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An accumulator, comprising:
 an oil chamber;
 a first piston separating a first gas chamber from the oil chamber;
 a second piston separating a second gas chamber from the oil chamber;
 a hydraulic borehole configured to at least partially receive a hydraulic cylinder assembly; and
 a fluid passage fluidly coupling the oil chamber to the hydraulic borehole;
 wherein the first gas chamber, second gas chamber, oil chamber, hydraulic borehole, and fluid passage are defined within a housing;
 wherein, the first and second piston are independently movable to alter the volume of the oil chamber.

2. The accumulator of claim 1, further wherein the first gas chamber is configured to provide a first pre-charge pressure and the second gas chamber is configured to provide a second pre-charge pressure, the second pre-charge pressure being different than the first pre-charge pressure.

3. The accumulator of claim 2, comprising a valve coupled to at least one of the first gas chamber or the second gas chamber, wherein the valve is configured to be coupled to a pressure source to alter the corresponding first or second pre-charge pressure.

4. The accumulator of claim 2, comprising a first valve coupled to the first gas chamber and a second valve coupled to the second gas chamber.

5. The accumulator of claim 4, wherein the first valve and the second valve are each coupleable to a pressure source to independently alter the corresponding first or second pre-charge pressure.

6. The accumulator of claim 1, wherein the first piston and second piston are configured to move coaxially along an accumulator axis in opposite directions as the volume of the oil chamber changes.

7. The accumulator of claim 1, wherein the first gas chamber and second gas chamber are defined in an accumulator borehole of the housing having a consistent diameter through first gas chamber and the second gas chamber.

8. The accumulator of claim 1, comprising an end cap selectively coupled to the housing to seal at least one of the first gas chamber or the second gas chamber.

9. The accumulator of claim 8, wherein the end cap selectively coupled to the housing further seals one end of the hydraulic borehole from the surrounding environment.

10. The accumulator of claim 9, wherein the end cap has an actuator coupler defined therein.

11. The accumulator of claim 9, further wherein the end cap is selectively coupled to the housing with one or more fasteners.

12. The accumulator of claim 1, wherein the fluid passage comprises a first partial through-hole and a second partial through-hole.

13. The accumulator of claim 12, wherein the second partial through-hole extends perpendicular to the first partial through-hole.

14. The accumulator of claim 13, wherein the first gas chamber and second gas chamber are defined in an accumulator borehole that is parallel to the hydraulic borehole.

15. The accumulator of claim 14, wherein the second partial through-hole is parallel to the accumulator borehole.

16. The accumulator of claim 1, comprising an electro-pneumatic system fluidly coupled to the first and second gas chambers to selectively alter a pre-charge pressure in each of the first gas chamber and the second gas chamber.

* * * * *